United States Patent [19]
Koltz

[11] 4,403,728
[45] Sep. 13, 1983

[54] COLLAPSIBLE GABLE TOP CONTAINER

[76] Inventor: Irving M. Klotz, 2085 Islington Ave., Penthouse 9, Weston Ontario, Canada, M9P 3R1

[21] Appl. No.: 377,539

[22] Filed: May 10, 1982

Related U.S. Application Data

[63] Continuation of Ser. No. 157,390, Jun. 9, 1980, abandoned, which is a continuation-in-part of Ser. No. 153,911, May 28, 1980, abandoned.

[51] Int. Cl.³ .................. B65D 5/10; B65D 5/46; B65D 25/28
[52] U.S. Cl. ................ 229/39 R; 229/52 B
[58] Field of Search ............ 229/52 B, 28 R, 6 R, 229/38, 39 R

[56] References Cited

U.S. PATENT DOCUMENTS

| | | | |
|---|---|---|---|
| 1,982,962 | 12/1934 | McAleer | 229/52 B |
| 2,959,337 | 11/1960 | Crane, Jr. | 229/52 B X |
| 3,096,012 | 7/1963 | Bryant et al. | 229/52 B |
| 3,150,769 | 9/1964 | Cohn | 229/52 B X |
| 3,166,235 | 1/1965 | Schroeder | 229/52 B |
| 3,581,974 | 6/1971 | Freeman | 229/52 B X |
| 3,640,380 | 2/1972 | Huffman | 229/28 R X |
| 3,722,782 | 3/1973 | Collie | 229/52 B X |
| 3,780,934 | 12/1973 | Gardner | 229/52 B |
| 4,010,888 | 3/1977 | Gilbert | 229/6 A X |
| 4,017,017 | 4/1977 | Vos | 229/38 |
| 4,238,069 | 12/1980 | Morris, Jr. | 229/52 B |

Primary Examiner—Herbert F. Ross
Attorney, Agent, or Firm—Sheldon H. Parker

[57] ABSTRACT

The container is formed from a single blank of paperboard or the like and has an integral handle and a reusable top closure. The top closure includes flaps foldably attached to the upper ends of the side walls, to define a top closure for said container and the top flaps have foldably attached thereto integral handle elements and has locking tabs extending from two opposing ends of the handle elements. Locking flaps are foldably connected to the upper ends of the end walls and have locking slots positioned to receive the locking tabs. The locking slots extending arcuately in at least one direction to permit the locking tabs to rotate about its fold line, about 90°.

24 Claims, 8 Drawing Figures

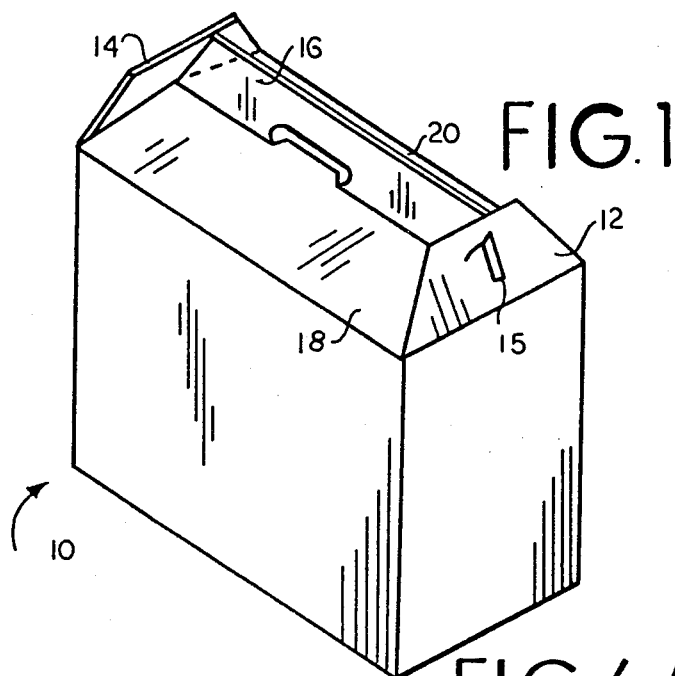
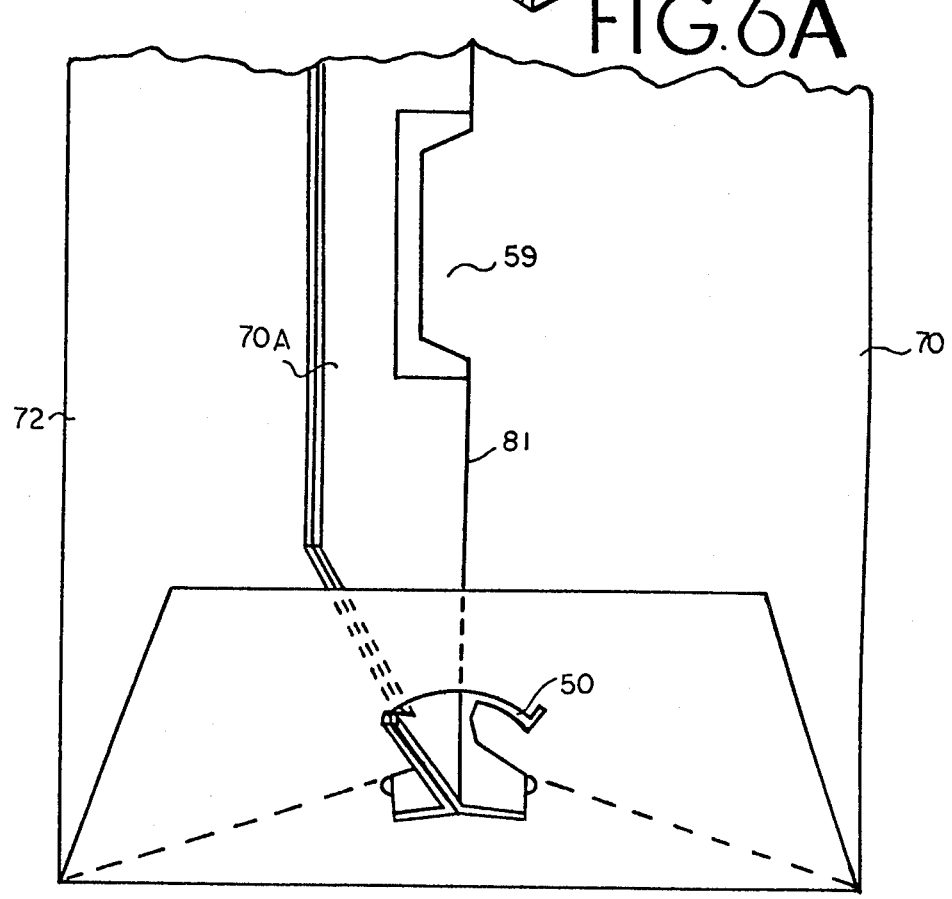

COLLAPSIBLE GABLE TOP CONTAINER

CROSS REFERENCE TO RELATED APPLICATIONS

The instant application is a continuation of application Ser. No. 157,390, filed June 9, 1980 now abandoned, which application was a continuation-in-part of Ser. No. 153,911, filed May 28, 1980 now abandoned.

BACKGROUND OF THE INVENTION

1. Field of the Invention

The present invention generally relates to collapsible containers and more particularly to a handled container having a collapsible gable top.

2. Description of the Prior Art

Collapsible or "knock-down" boxes are well known in the prior art teachings. The bottom structure used is not narrowly critical in dimension and can be of any desired design. The gable structure contributes to the rigidity of the box and provides extra internal volume, but must be limited in height to permit a collapsing of the roof. The angles involved in the gable are of criticality to avoid excessively awkward folding operation and to facilitate in the spring motion of the handle into the upright position. Examples of some prior art patents being U.S. Pat. Nos. 4,017,017 and 3,640,380.

In the forenoted U.S. Pat. No. 3,540,380, a gable roofed container which can be rapidly and reliably closed, opened and reclosed is disclosed. However, the container has several drawbacks which limit its utility and preclude its achieving commercial success in certain markets.

The locking tabs shown in this patent, in order to enable the structure to be locked securely, are provided with a substantial recess to receive the closure flaps 19. However, the firmness of locking is attained at the expense of ease of closing. The container also utilizes one vertical slit 26 through which the locking tabs 24 pass. The type of locking mechanism provides little support to prevent the handle 21 from a horizontal motion. This presents a critical drawback if the container is to be used for merchandise, such as bakery goods, which require total control of the horizontal orientation of the contents. In addition, any downward motion, such as may be caused while sliping ones hand through the handle, will cause the notches to slip out of the vertical slit. This is an added inconvenience as extreme care must be taken to prevent spillage and hampers the carrying of other packages.

It has long been desired to combine the aesthetic and functional advantages of a gable top or "knock-down" container with those of flat top containers, particularly the ability to stack containers or to tie several containers together for customer convenience. It is obvious, however, that the peak of the gable prevents simple stacking or tying together of boxes, due to the absence of a pair of flat surfaces.

The gable top containers of the instant invention contain a plurality of critical features which independently and/or in combination provide significant improvements and a unique structure.

SUMMARY OF THE INVENTION

The shortcomings of the prior art structures have been overcome through the use of a container which can collapse to a flat structure and whose top is in the form of a gable which can independently collapse to form a box with a flat top.

BRIEF DESCRIPTION OF THE DRAWINGS

FIG. 1 is a perspective view of a container in accordance with the present invention;

FIG. 6A is a fragmentary top view of the present invention showing a partially flattened gable top; and, FIG. 7 is a cross-section of a container in accordance with the present invention.

DETAILED DESCRIPTION OF THE INVENTION

Figure 4:
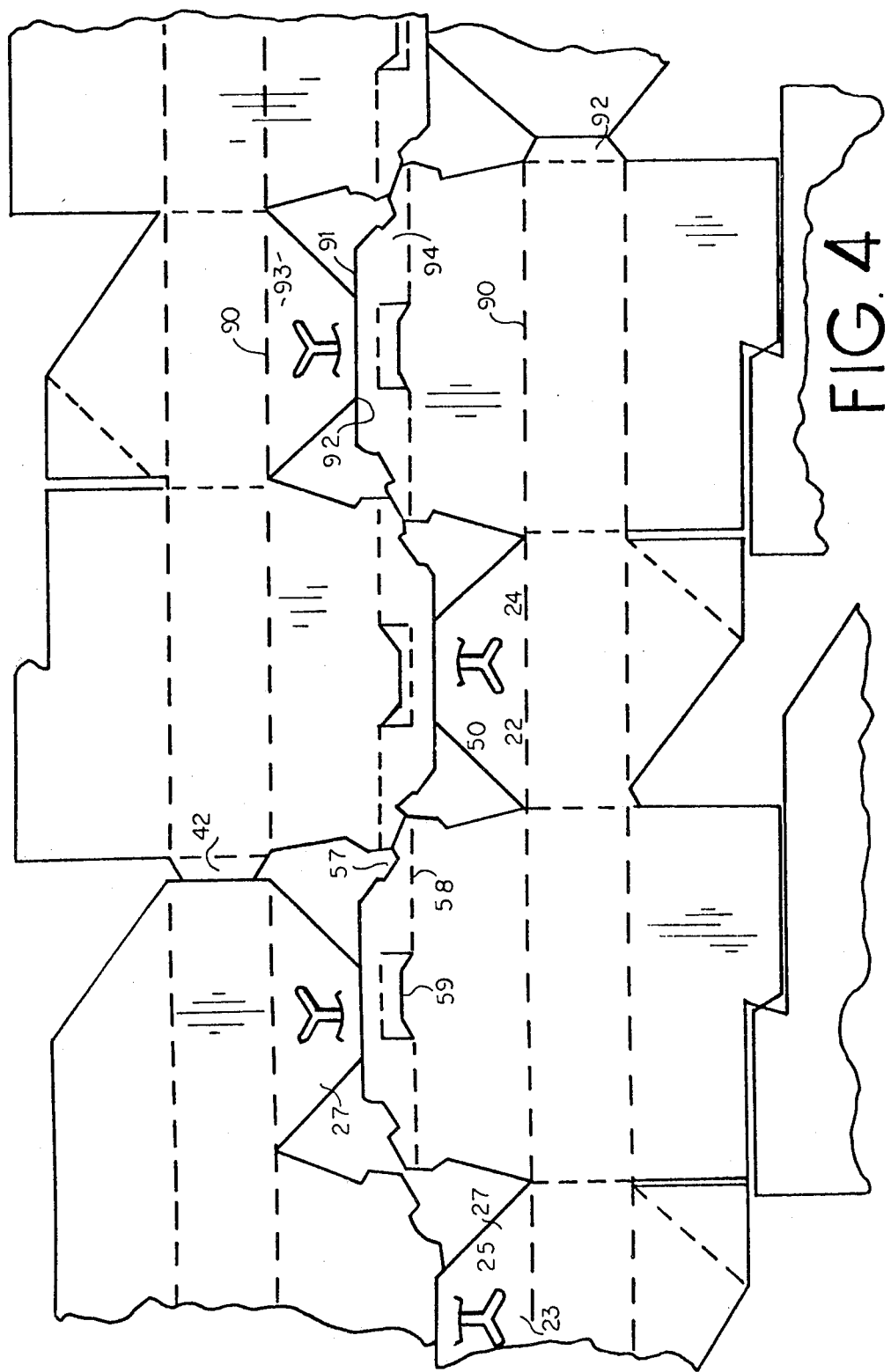
FIG. 4 is a plan view of a portion of a continuous roll showing the outline and scorelines of a plurality of blanks positioned for optimum use of material.

FIG. 1 illustrates the box 10 of the instant invention in an assembled and locked position. The sloped flaps 18 and 20 are scored at 18A at time of manufacture, toward their outer edge, providing the fold lines to form the handle 16. Tabs 15 are formed from an extended portion of the handle 16 to provided the locking mechanism of the container. FIG. 4 illustrates the blank for the preferred embodiment of the instant invention, disclosing the proportions of the container score lines. The gable ends 12 and 14 serve as locking flaps by interacting with tabs 15 and 15A which extend from the upright handle.

Figure 2:
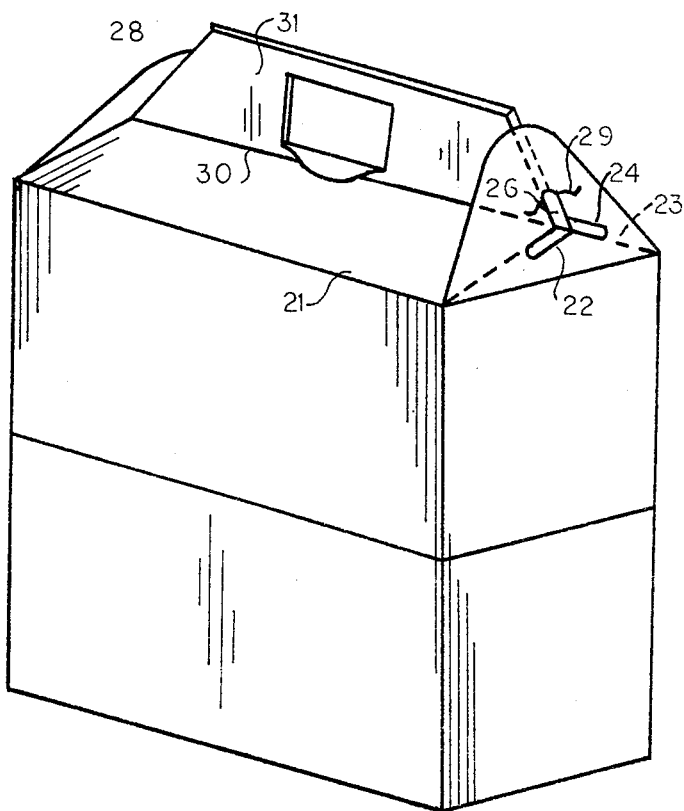
FIG. 2 is a perspective view of the preferred embodiment of the present invention.

In FIG. 2, the preferred embodiment of the instant invention, the sloped flaps 21 and 23 are provided with locking tabs 22 and 24, forming an inverted "Y" when assembled. The instant invention provides less resistance to the assembly operation than that of U.S. Pat. No. 3,640,380, since the flexibility of the tabs and mobility of components is sufficient to accomodate the closing action, whereas the structure of the aforenoted patent requires substantial distortion of parts during the locking step and does not lend itself to either repeated opening and closing or rapid assemblying.

The inward sloping of the gable ends 27 and 28 permits each of the tabs 22, 24 and 26 to be positioned inwardly of the end walls, thereby permitting side by side stacking of assembled boxes.

The end tabs 22 and 24 are supportive of the sloping flaps 21 and 23 and contribute not only to the locking operation, but also to the rigidifying of the closed box, aiding in the prevention of horizontal as well as vertical movement.

Figure 5:
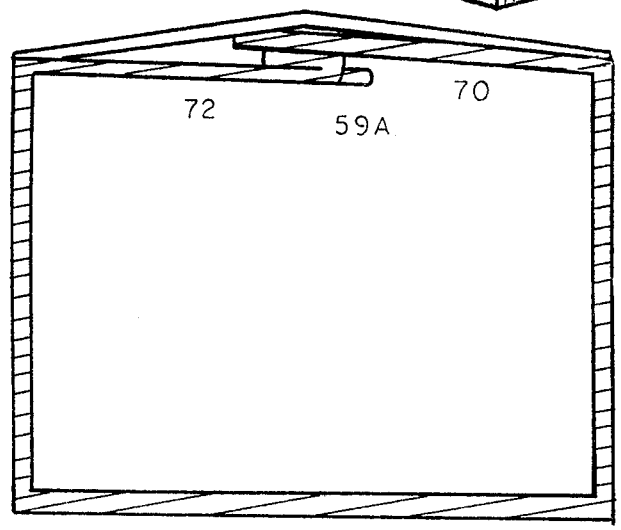
FIG. 5 is a cross-section of a container having its gable top in the flattened position.
Figure 6:
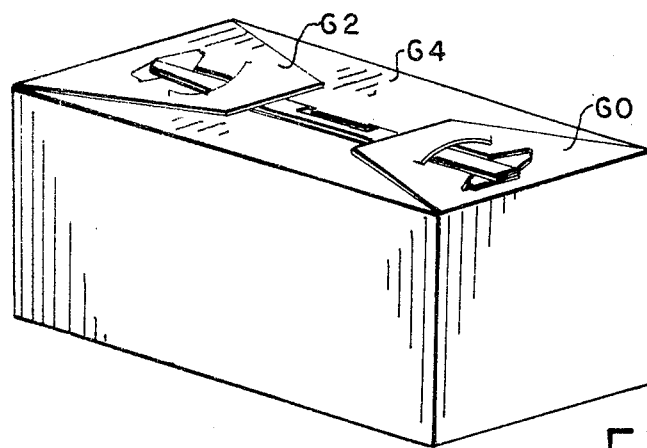
FIG. 6 is a perspective view of a container having its gable top flattened.

The arcuate slit 29 permits the handle section 31 to rotate about its fold line 30. This rotation enables the gable roof to form the essentially flat top configuration as illustrated in FIGS. 5 and 6. The minimum length of the slit is an arc of at least 20° and preferably at least 30°. The length of the arc is at least in part dependent upon the distance between the fold line 30 and the vertical slit 34. The minimum distance is dependent upon the strength of the material from which the container is made since it is preferred to have the locking tab rotate with the handle. As previously stated, for the user to feel secure in the use of the container and have total control of the horizontal orientation of the contents as required, the handle must be supported in its upright position. It is for this reason that it is preferred to use the combination of an arcuate slit 29 and a inverted "Y" 34 to accomodate the rotation of the handle section, rather than a full opening in the form of a quadrant, or the like. The space between the ends of the slit 29 define the degree of permissible movement of the handle.

The three legged tabs of the preferred embodiment not only serve to provide support for the sloped flaps 21 and 23 when the package is open, and rigidify the overall structure, they contribute to the inherent tendency of the handle to move from the folded to the upright position and add to the effectiveness of the locking of the end tabs to the end flaps. By way of contrast to the aforenoted prior art, the three legged structure of the instant invention can achieve the high positive locking of the U.S. Pat. No. 3,640,380 structure with less resistance or difficulty in closing.

Figure 3:
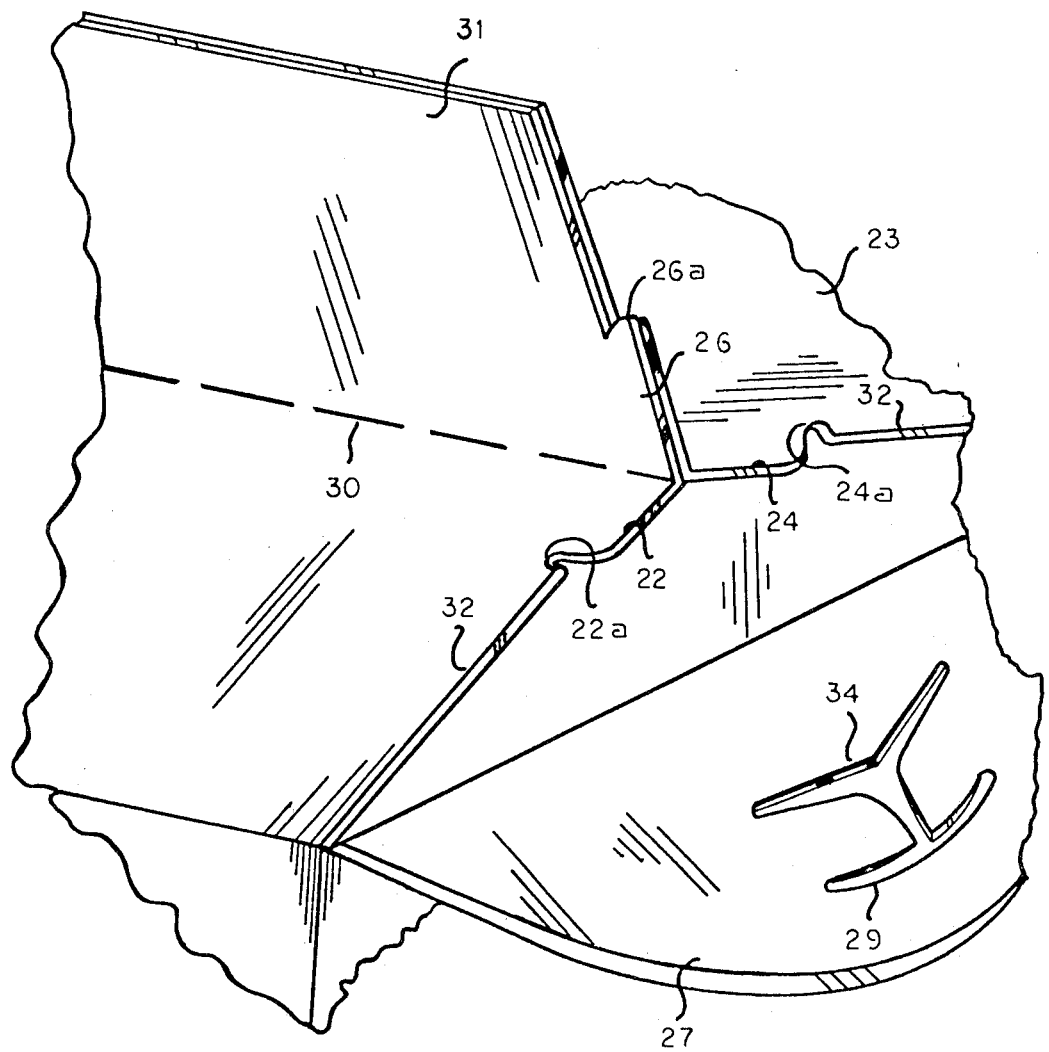
FIG. 3 is a fragmentary perspective view of the preferred embodiment of the end closure.

FIG. 3 illustrates the positioning of the end tabs 22, 24 and 26 prior to snaping on the end flap 27. The leading edge 32 of the trapezoidal sloping panels engages the end flap 27, being held firmly against each other by the locking action of the end tabs 22, 24 and 26. The rigidity of the structure is thus greatly increased. The end tabs 22, 24, and 26 contribute substantial structural rigidification by providing an absolute engagement and precluding downward motion of the handle 31 and the sloping panels 21, relative to the remainder of the container. The greater the size of the end tabs 22, 24 and 26, obviously the greater the limitation of the sloping side panels movement relative to the end panel and the more rigid the structure. Most critically, in currently available commercial structures, downward pressure on the handle causes the locking tabs to disengage and open the package top, often advertently. Even when locked, relative movment of parts can be substantial, thus producing a feeling of lack of confidence in the package.

One of the main advantages of the instant invention over the prior art is the ability to rotate the handle allowing the boxes to be stacked, while not compromising the strength of the container. In order to facilitate the rotation of the handle, thus collapsing the gable top, with little or no resistance and minimal package distortion, notches 22A and 24A have been added. At the angle created by the meeting of the leading edges 32 and the end tabs 22 and 24, "notches" 22A and 24A permit the end flap 27 to slide sufficiently over the sloping flaps 21 and 23 and the handle 31 to lie flat. The notches 22A and 24A can be small and, depending upon package dimension, typically less than about a quarter inch. To attempt to rotate the handle 31 without the aid of the notches 22A and 24A causes substantial distortion of the container and resistance to achieving a smooth surface.

When the end flap 27 is snapped onto the end tabs 22, 24 and 26 with the arcuate slit 29 resting in the locking recess 26A, the container will then appear as in FIG. 2.

In producing the carton, a blank 90 is diecut from a continuous roll of stock of any desired material, as illustrated in FIG. 4, such as paperboard or the like, which if desired, can be coated for grease or water resistance, moisture impermeability or aesthetic enhancement. It is scored along the fold lines either during or prior to the cutting step. The glue laps 92, are adhered to the corresponding regions by folding over the blank to form a knock-down container. During the assembly operation, the side walls of the container are squared up and the bottom section interlocked in the opened position. The scoring, die cutting, gluing and partial assembly steps are well known in the art and discussed, for example, in U.S. Pat. No. 4,010,888.

While the configuration of the blank from which the container is made is to a great extent controlled by the design of the container, the design of the blank is critical from the standpoint of permitting minimum material wastage. The blanks are cut from a continuous roll of paperboard or the like with the width of the roll preferably equal to a whole number of blanks nested as illustrated in FIG. 4. It is thus evident that the shape and dimension of the panels should be selected to maximize the nesting capabilities and minimize the amount of unused material. Thus, the distance between the parallel fold lines 90 and $90^1$ should not be substantially greater than the combined length of the distance between the fold line $90^1$ and the edge 92 of the gable end panel 93 and the distance between the fold line 90 and the edge 91 of the handle panel 94.

In FIGS. 5 and 6 the gable is shown in the flat configuration. The side view of FIG. 5 illustrates the overlying flaps 70 and 70A which overlie the upper edge of the cooperating sloping flap 72. Overlying flaps 59 and 59A formed from part of the cut-out section of the handle 70, as shown in FIG. 6A, which allows for the users hands to slip through. The overlying flaps 59 and 59A and the handle locking flap 59B and 59C, if used, preclude the sliding of one sloping flap 70 relative to sloping flap 72.

Surprisingly, it has been found that if the distance from the handle section 75 crease line 81 to the sloping panel 70 outer crease line 76 and the corresponding width of matching flap 72 are equal to no greater than about one half the distance 80 between the end walls 78 and 79, the handle sections can be locked together and sliding of one member over another is not required. Obviously, when opened, as illustrated in FIG. 7, distortion occurs and produces a desirable rigidifying of the package, in contrast to the distortion encountered when employing sloping flaps significantly greater than one half the distance 80 which precludes the achieving of a smoothly flattened top surface.

The overlap flaps 59 and 59A serve to maintain the sloped closure flaps 70 and 72 in their uppermost position. The locking tabs similarly have the same effect on the structure and thus, also contribute to the tendency of the gable top to spring back to its opened position as well as contributing to the structural rigidity of the container.

Figure 7:
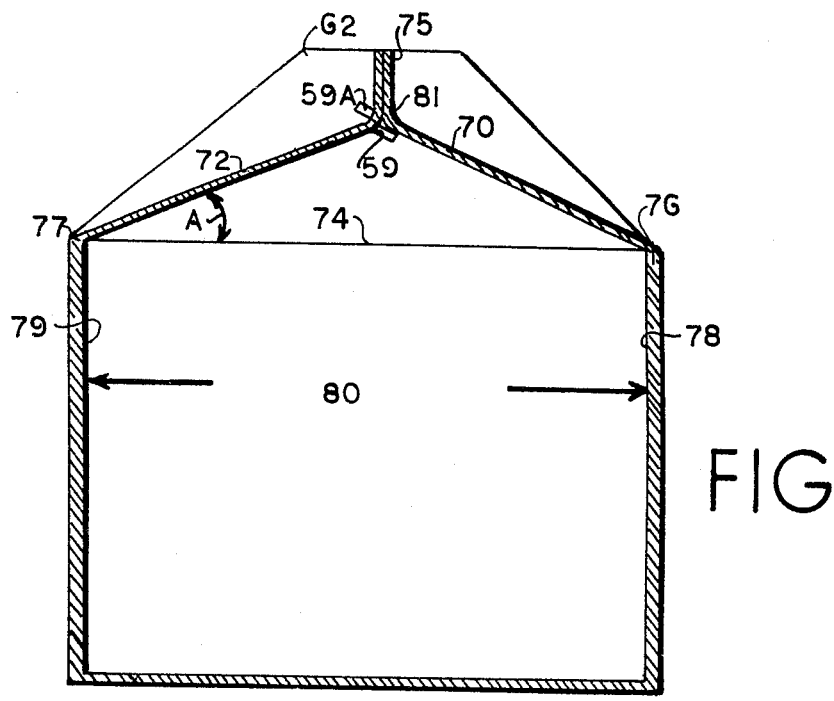

The knock-down type of bottom closure is well known in the art and can be provided with interlocking tabs as illustrated in FIG. 7.

The sloped flaps 72 and 70 are in the form of a trapezoid. The acute angles of the trapezoid should be approximately in the same range as described in connection with FIG. 7. The use of too large an angle will result in too shallow a slope and too small an angle will result in the locking panels being inadequately sloped. Proper sloping of each of the four top flaps is essential to the gable being capable of being knocked down to an essentially flat configuration.

In order for the flattening or collapsing of the gable roof to be achieved it is necessary for the angle A of FIG. 7, formed by the sloping side flaps 70 and 72 and the fold line 74 of the locking flaps to be within a range between 10° and 30°, with the preferred angle being in the 15° to 25° range. An angle of less than 10° is not desirable because of the loss of the value derived from gable structures while at over 30°, the folding operation becomes increasingly awkward, the resistance to folding is excessively great and extreme distortion is required.

The gable top is converted to a flat top by rotating the end locking tabs 26 and 26A of FIG. 3. The greater the angle A, the more difficult it becomes to achieve the flattening of the top surface since the overlapping of the closure flaps 70 and 72 increases at double the rate of increase of the length of the flap 72.

The dimensions of the sloped trapezoidal flaps 70 and 72 also contribute to the ability of the container to be provided with a flat top by rotating the handle, as previously stated. The gable or tent shaped slope of the trapezoidal panel creates an appearance that the distance between the outer edge 76 of the trapezoidal sloping panels 70 and 72 which forms the upper edge of the package and the crease line 81 between the handle panel 81 and the sloping panel 70 and 72 is the hypotenuse of the triangle formed by the sloping panels 70 and 72 and one half of the upper line of the end panel. However, the length of this distance should be no greater than one half of the width of the end panel, that is its distance 80 between its corners 78 and 79. Thus, as evident in FIG. 7, the thickness of the handle sections 75 and the width of the trapezoidal panels 70 and 72 provides a package top width comparable to the sides and bottom widths, and consequently no distortion. In the gable or tent form, the package is pulled inwardly due to the requisite shorting of the top width to provide a distance between edges 76 and 77 which is equal to the distance 80. Since the latter distance cannot decrease, the top edges 76 and 77 must distort. This distortion causes tensions which rigidify the package and are actually beneficial, unlike the undesirable distortion produced when flattening the top of a container having panel lengths 70 and 72 which combined are greater than the length of the distance 80 between the ends 78 and 79.

For an angle A of 20°, the width of a 10 inch wide container is distorted by an amount equal to 0.6 inch. The amount of foreshortening or distortion which is produced is dependent upon the inclination angle A of the trapezoidal sloping panels 70 and 72. The amount which each of the side walls 78 and 79 must be pulled inwardly toward the center line is equal to half the width of the container minus the cosine of the inclination angle multiplied by the length of the sloping panel 70 or 72.

Thus, each of the panels should not be greater than half of the horizontal distance which must be spanned, but their length should be close to half the distance so as to provide a limited or controlled degree of tensional rigidification.

In other words, (width 80)−(length of panel 70)(cosine A)=distortion. It should be noted that this magnitude of distortion is not apparent from looking at the carton and has no adverse affect.

What is claimed is:

1. A container prepared from a single blank of paperboard and/or the like and having an integral handle and a reusable top closure locking means comprising:
   a. opposed pairs of side walls;
   b. opposed pairs of end walls foldably connected to said opposed pair of side wall to define a tube;
   c. bottom closure panel means foldably connected to the lower ends of said side walls and end walls, to form a complete bottom closure;
   d. a top closure flap foldably attached to the upper end of each of said side walls, to define a top closure for said container;
   e. a handle element foldably attached to and integral with each of said top closure flaps;
   f. locking tabs extending from two opposing ends of said handle elements;
   g. locking flaps foldably connected to the upper ends of each of said end walls, each of said locking flaps having a locking slot positioned to receive a locking tab; and
   h. said locking slots extending arcuately in at least one direction to permit said locking tabs to rotate in said locking slot and to permit said top closure flaps to rotate about there fold lines, about 90 degrees.

2. The container of claim 1, wherein said top closure flaps are essentially trapezoidal and have as there longest side the edge attached to the upper ends of said side walls and wherein its acute angles are in the range from 10 to 30 degrees.

3. The container of claim 1, wherein said locking tabs having a first peripheral region having an effective length which is slightly greater than that of its corresponding locking slot and a second region of smaller effective length than that of said corresponding locking slot so as to provide a locking interaction when said locking tabs are positioned in said locking slots thereby locking said container in its closed position.

4. The container of claim 1, wherein said locking flaps lie in a plane which forms an angle between about 10 and 30 degrees with the plane of the side walls.

5. The container of claim 1, wherein locking slots have a narrow vertical region and a slit extending from its upper arcuately in at least one direction through an arc of at least 10°.

6. The container of claim 1 wherein the locking flaps are provided with a pair of slots extending downward and outward from said vertical slot and said top closure flaps are provided with top closure tabs, said slots and said locking tabs and said top closure tabs being positioned to interact and lock said container in its closed position.

7. The container of claim 6, wherein each of said locking and said top closure tabs have a first region having a length which is slightly greater than its corresponding slot and a second region of smaller length so as to provide a locking action.

8. The container of claim 1, wherein said top closure flaps lie in a plane which forms an angle between about 10° and 30° with the plane of the bottom closure.

9. The container of claim 8, wherein said angle is between 15° and 25°.

10. The container of claim 1, wherein said top closure flaps have an extension portion, the extension portion of one flap overlying the extension portion of the other flap.

11. The container of claim 10, wherein said handle portion has an opening with the fold line between said closure flap and said handle portion being a peripheral edge of said opening and wherein one of said extension portion of one flap extends through said opening.

12. The container of claim 6, wherein each of said top closure flaps have a notch at the region of juncture between the peripheral edge of said top closure flap and its top closure tab, whereby said locking flaps can collapse and completely overlie said top closure flaps and said top closure tabs can extend further through their respective slots in the collapsed position than in the upright position due to the notches.

13. The container of claim 1, wherein width of each top closure flap from a side wall to the juncture of the handle element is about equal to one half the width of said end walls.

14. The container of claim 1, wherein the width of each top closure flap is a length no greater than, but not substantially less than one half the width of said wall.

15. The container of claim 2, wherein said angle is from about 15° to 25°.

16. The container of claim 4, wherein said angle is between 15° and 25°.

17. The container of claim 9, wherein the outermost edges of each of said tabs lie inward of the plane of the side wall panels.

18. A blank for a collapsible container comprising:
in series, a first end wall panel, a first side wall panel, a second end wall panel and a second side wall panel, and an end tab panel, each panel being interconnected to its adjacent panel by a fold line, each fold line being parallel to the other fold line, each of said first end wall panel, first side wall panel, said second end wall panel and said second side wall panel being interconnected at one side by a first score line to a bottom panel and at the side opposite said one side, interconnected by a second score line to top panel, a first pair of trapezoidal alternate top panels having a handle panel interconnected thereto by a fold line parallel to said first score line and said second score line, at least first locking tab extending from a handle panel in a first direction and at least second locking tab extending from a handle panel essentially in the opposite direction when assembled, the second pair of alternate top panels having a centrally positioned slot normal to said first score line and positioned to receive and lock with at least one locking tab when said container is in its assembled position, and rotation permitting means associated with each slot to permit a locking tab received therein to rotate approximately 90° relative to the orientation of said slot when said container is in its assembled position.

19. The blank of claim 5 further comprising at least a third tab and extending from a non-parallel edge of a trapezoidal top panel and positioned to be received in a second slot offset from about 105° to about 125° from said centrally positioned slot.

20. The blank of claim 6, wherein said centrally positioned slot intersects with a pair of second slot extending in opposite directions and having and included angle of from about 130° to about 150° and each handle panel has a pair of tabs interconnected to a locking tab by a fold line.

21. The blank of claim 7, wherein said rotation permitting means is an arcuate slit extending from the top of the centrally positioned slot, at least about 20° in each direction.

22. The blank of claim 5 wherein the distance between parallel edges of each trapezoidal top panel is a length no greater than, but not substantially less than one half the width of said end wall panel.

23. A container prepared from a single blank of paperboard and/or the like and having an integral handle and a reusable top closure locking means comprising:
 a. opposed pairs of side walls;
 b. opposed pairs of end walls foldably connected to said opposed pair of side wall to define a tube;
 c. bottom closure panel means foldably connected to the lower ends of said side walls and end walls, to form a complete bottom closure;
 d. a top closure flap foldably attached to the upper end of each of said side walls, to define a top closure for said container;
 e. top closure tabs extending from two opposing ends of each of said top closure flaps;
 f. a handle element foldably attached to and integral with each of said top closure flaps;
 g. locking tabs extending from two opposing ends of said handle elements;
 h. locking flaps foldably connected to the upper ends of each of said end walls, each of said locking flaps having a locking slot positioned to receive a locking tab, and having a pair of top closure tab receiving slots extending outwardly from said locking slot; and
 i. at least one opposing pair of said locking tabs and said top closure tabs having a first peripheral region having a length which is slightly greater than that of its corresponding slot and a second region of smaller length than that of said corresponding slot so as to provide a locking interaction when said locking tabs are positioned in said locking slots and said top closure tabs are positioned in said top closure tab receiving slots, thereby locking said container in its closed position.

24. The container of claim 23, wherein the said locking slots extend arcuately in at least one direction to permit said locking tabs to rotate about its fold line, about 90 degrees.

* * * * *